United States Patent [19]
Giessler

[11] Patent Number: 5,993,120
[45] Date of Patent: Nov. 30, 1999

[54] INTERNAL THREAD-PRODUCING TOOL AND METHOD

[75] Inventor: Josef Giessler, Mühlenbach, Germany

[73] Assignee: Sandvik Aktiebolag, Sandviken, Sweden

[21] Appl. No.: 09/058,851

[22] Filed: Apr. 13, 1998

[30] Foreign Application Priority Data

Apr. 11, 1997 [SE] Sweden ................................ 9701333

[51] Int. Cl.⁶ .......................... B23B 51/06; B23G 5/06
[52] U.S. Cl. ...................... 408/59; 408/222; 470/198
[58] Field of Search .................... 408/57, 59, 222, 408/1 R; 470/198

[56] References Cited

U.S. PATENT DOCUMENTS

| | | | |
|---|---|---|---|
| 83,371 | 10/1868 | Foster | 408/57 |
| 3,153,885 | 10/1964 | Keller et al. | 408/59 |
| 4,462,727 | 7/1984 | Marburger . | |
| 4,762,444 | 8/1988 | Mena | 408/59 |
| 5,487,626 | 1/1996 | Von Holst et al. . | |

FOREIGN PATENT DOCUMENTS

| | | | |
|---|---|---|---|
| 24 14 635 | 10/1975 | Germany . | |
| 83 24 835 | 12/1983 | Germany . | |
| 3307555 | 9/1984 | Germany | 408/59 |
| 34 19 850 | 11/1985 | Germany . | |
| 86 23 509 | 2/1988 | Germany . | |
| 102613 | 6/1983 | Japan | 408/59 |
| 63-306820 | 12/1988 | Japan | 470/198 |
| 2-100820 | 4/1990 | Japan | 470/198 |
| 642091 | 1/1979 | Russian Federation | 408/59 |
| 04997 | 4/1992 | WIPO | 408/57 |

Primary Examiner—Daniel W. Howell
Attorney, Agent, or Firm—Burns, Doane, Swecker & Mathis, L.L.P.

[57] ABSTRACT

A thread-producing tool for producing an internal thread includes a body forming a rear shank portion and a front cutting portion. Provided in the body is a lubricant storage chamber for storing liquid lubricant which is driven toward the cutting portion through discharge passages under the action of centrifugal force during a thread-cutting operation.

9 Claims, 2 Drawing Sheets

INTERNAL THREAD-PRODUCING TOOL AND METHOD

BACKGROUND OF THE INVENTION

The present invention relates to an internal thread producing tool, which can be either a cutting screw tap or a non-cutting thread former. Conventionally the tool is either of high-speed steel or carbide metal. The invention also pertains to a method of forming an internal thread.

Shown in FIG. 1 is a conventional screw tap which is a cutting tool for cutting an internal thread. The tap includes a rear shank 1 for being clamped in a tool support, and a front thread cutting part, the so-called chamfer a, consisting of screw turns. The chamfer is arranged on the free end of the tool and is interrupted by longitudinal grooves for chip removal. Disposed rearwardly of the chamfer is the so-called guide or guide part b, which also consists of screw turns interrupted by grooves for chips. The guide part does not perform any cutting work, however, but serves, as the name implies, for the guiding and the uniform driving of the screw tap through the hole to be tapped. Tools producing internal thread without the use of a guide part have also been proposed recently for rigid tapping, see Swedish Patent Application 9600927-9.

In principle there are two basic types of screw taps, namely the bottoming tap (also called blind hole tap) and the straight-through tap. As the names imply, holes open on one side and closed on the other side by a bottom are involved in the first case, while bottomless holes open on both sides are involved in the second case. In the first case the chips have to be conveyed out of the hole, in the opposite axial direction to that of the tapping. The grooves for chips are consequently formed helically in the same direction as the direction of rotation of the tap, whereby they have a chip-conveying effect. Known bottoming taps are described e.g. in DE-U-86 23 509.5, Marburger U.S. Pat. No. 4,462,727 and Von Holst et al. U.S. Pat. No. 5,487,626.

In the second case (i.e. with straight-through taps) it is more favorable if the chips are conveyed to the front, through the hole, in the same direction as the tapping direction. In this case, therefore, the grooves for chips are formed helically opposite the direction of rotation of the tap and thereby have the effect of driving the chips towards the tap tip. Examples of straight-through screw taps are described for example in DE-A-3 419 850 and DE-U-83 24 835.8.

Also known are screw taps with straight, axially extending grooves for chips, which in principle convey the chips neither to the front nor to the rear. These are particularly suitable with short-chipping material and with small thread depths. Three different types of taps with straight-line grooves are often employed, namely, a taper tap, a second tap and a plug tap.

Unlike the screw tap, thread formers do not produce any chips; they simply deform the material. With thread formers also it is the practice to speak of a "chamfer" and a guide part, although the term chamfer is strictly speaking incorrect, since thread formers do not cut. For the sake of simplicity, however, this expression will also be used here for describing the tapering front part, in which, as in the case of screw taps, the work (albeit deforming work) for producing the thread is performed. A thread former according to the state of the art is described, for example, in DE-A-2 414 635.

It is normal to use considerable amounts of coolants and lubricants when operating the thread-producing tools described above. In recent times, however, a strong trend in general towards dry machining can be noted, not only in the production of thread but also, or even in particular, in turning, drilling and milling. The main reasons for this are to save on the costs of cooling lubricants and to protect the environment.

Various machining processes can be converted to dry chipping relatively easily. The latter include, e.g.,turning and milling. Other processes present far greater problems when they are carried out dry screw tapping and thread forming are particularly problematical. In such cases the so-called minimal lubrication technique is often used as a possible solution wherein minimal lubricant is fed via nozzles from the outside or centrally through the spindle and the tool. It is therefore often necessary for the screw tapping process (or thread forming process), to install a minimal lubrication system on the machine. This naturally complicates the machine and makes it more expensive.

The invention is consequently based on the aim of saving on cooling lubricant costs and protecting the environment.

It is further an object of the invention to avoid the need for the installation of a minimal lubrication system on a thread-producing machine.

SUMMARY OF THE INVENTION

These and other objects clear to the skilled artisan are achieved by the present invention, in which a thread-producing tool comprises a body having a rear shank portion and a front thread-forming portion. The body includes a lubricant chamber disposed therein for storing liquid lubricant. The chamber includes at least one lubricant discharge passage extending from the chamber to the front thread-cutting portion for discharging liquid lubricant.

The invention also relates to a method of producing an internal thread in a workpiece which comprises the steps of:

A) providing a tool formed by a body having a rear shank portion, a front thread-forming, and a lubricant chamber formed in the body communicating with the thread-forming portion by at least one discharge passage;

B) storing liquid lubricant in the chamber; and

C) rotating the tool during a thread-forming operation wherein the liquid lubricant is displaced through the discharge passage under the action of centrifugal force.

BRIEF DESCRIPTION OF THE DRAWING

The invention will now be described in detail below by means of embodiments shown in the drawings, wherein.

DETAILED DESCRIPTION OF THE PREFERRED EMBODIMENTS OF THE INVENTION

Figure 1:
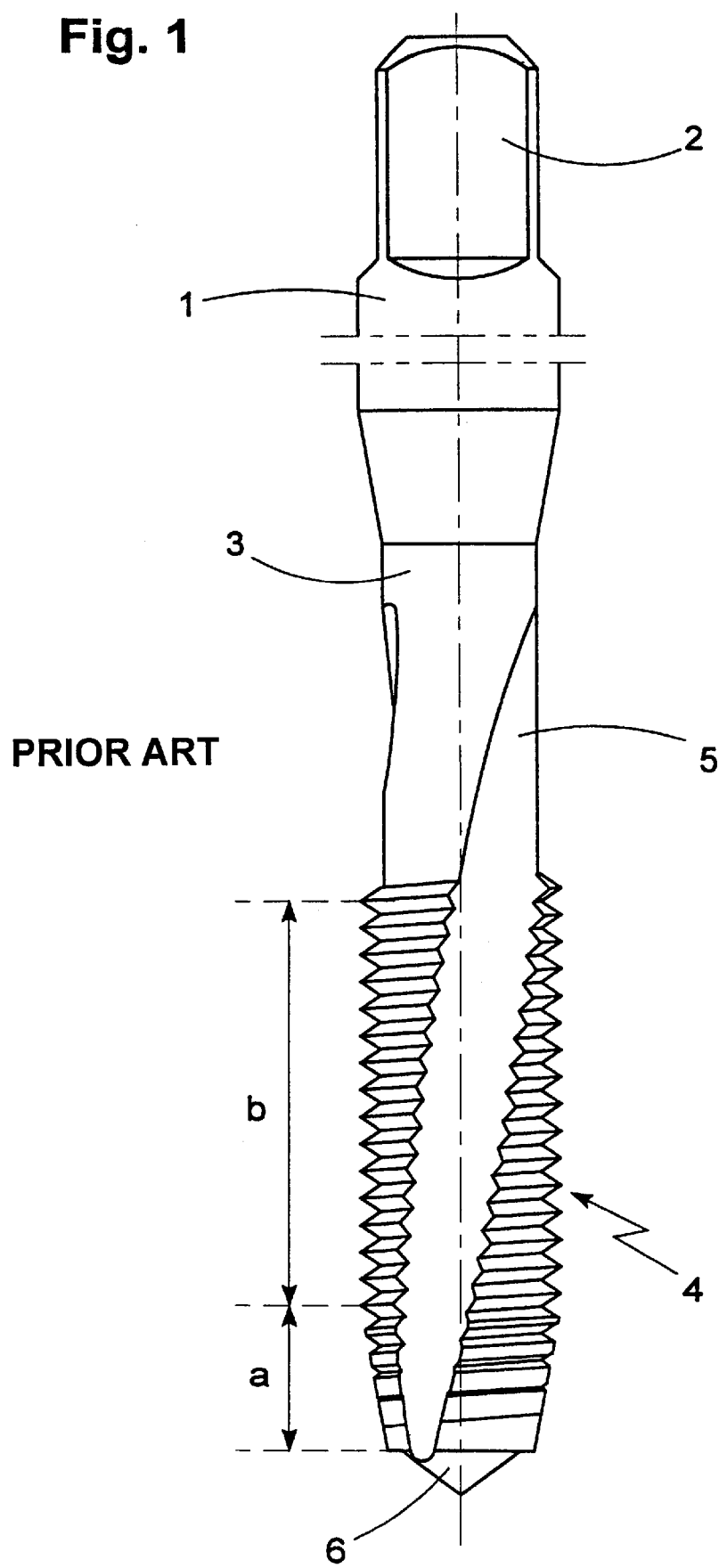
FIG. 1 shows a conventional spirally grooved screw tap.

As shown in FIG. 1, a commonly used bottoming screw tap incorporates a shank 1 and a square 2, which is disposed on the shank 1 for the transmission of a turning moment in a case. Extending forwardly from the shank is a taper-shaped neck 3, and extending forwardly from the neck 3 is a screw head 4. The head 4 and the neck 3 are provided with for example three equidistant, helical grooves 5 for chip removal. The operative front end of the tool is normally provided with a conical tip 6, which has no function, but is there only on manufacturing grounds.

As already mentioned above, the screw head of the commonly used screw tap (and also the commonly used thread former) incorporates a chamfer a and a guide part b. As can be seen from all the figures, the chamfer a tapers substantially uniformly to the front. Whereas the whole of the chipping takes place in the chamfer area a, the guide part b serves merely for the axial guiding of the tool in the already produced thread. According to the above-mentioned SE-A-9600927-9 the guide part b can be omitted for rigid screw tapping ("rigid tapping").

In order to achieve the aims mentioned earlier, a minimal lubricant chamber is formed in the thread-producing tool according to the invention, wherein the lubricant is conveyed via fine bores at least aided by centrifugal force occurring during the machining, without there occurring an additional external effect on the tool cutting edges. Moreover, no coolant is supplied from the outside during the whole period of use, the lubricant from the chamber takes over this function.

Figure 2:
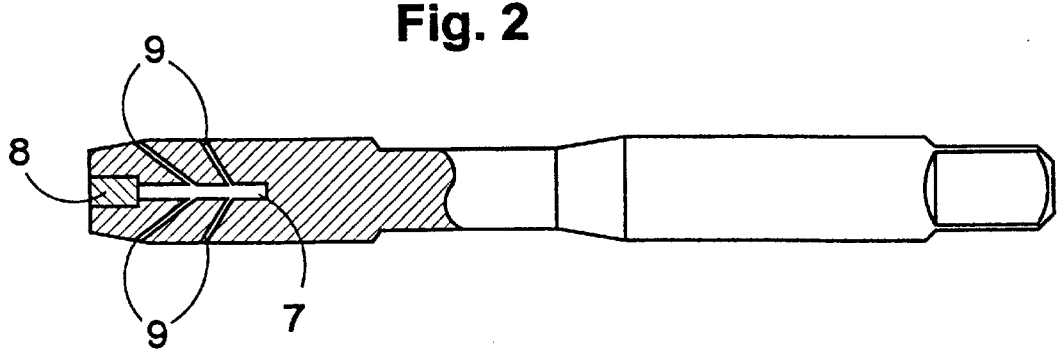
FIG. 2 a longitudinal section of a screw tap according to a first embodiment of the invention, FIG. 3 a longitudinal section of a screw tap according to a second embodiment of the invention, and FIG. 4 a longitudinal section of a screw tap according to a third embodiment of the invention.

According to the embodiment in FIG. 2 a minimal lubricant chamber 7 is located in the screw head. The chamber 7 comprises a bore which extends to the front or distal end of the tool. The front end of the bore can be widened slightly and accommodate a closure 8. In so doing the conical tip 6 of FIG. 1 has preferably been eliminated. The nature of the closure 8 is not material to the invention, but it could, for instance, comprise an externally threaded screw, or a pin which is glued or pressed-in. The use of a soft pin of light metal such as aluminum is also conceivable, which is heat-sealed during the pressing in. Blind rivets could also be used.

Disposed obliquely (or alternatively directly radially) outwards from the chamber 7 are feed bores or discharge passages 9 for feeding the lubricant to the chipping point, i.e. to the chamfer, and optionally also to the guide part. The necessary bore diameter of said feed bores depends on the viscosity of the minimal lubricant and lies in general in the range between 0.01 and 0.4 mm, preferably between 0.05 and 0.2 mm. The number of feed bores is not critical and can be e.g. from two to eight. Up to approximately 0.2 mm diameter the feed bores are normally manufactured by erosion; below 0.2 mm by laser drilling. Both methods can be used both for high-speed steel and for carbide metal.

The required amount of minimal lubricant is extremely small and normally lies between 1 and 20 ml per hour. In view of these very small amounts which are provided, a minimal lubricant with particularly good SPRITE affect (i.e., the property of the minimal lubricant to spread and distribute itself very rapidly on the surface of the tool and of the workpiece) is required. The use of simply any cutting oil, such as were known previously, is therefore not preferred, but special minimal lubricants, such as are conventional, are employed.

Figure 3:
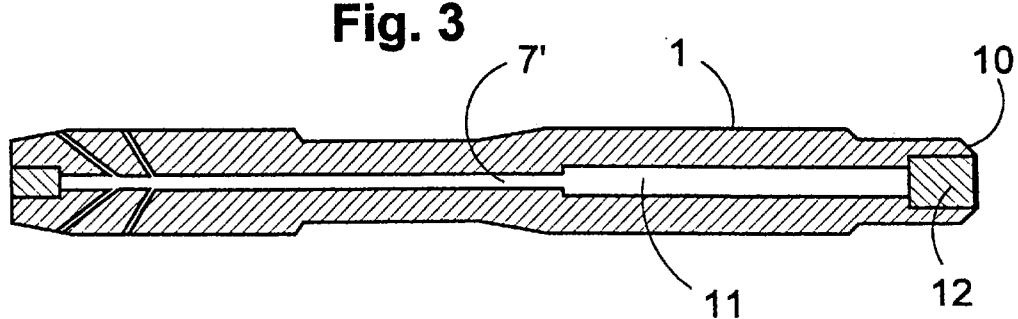

According to the embodiment shown in FIG. 3 the chamber 7' is longer, i.e., it is continuous, from the distal end of the tool up to the shank end. In order to be able to accommodate more lubricant, the bore can have a greater diameter in the shank than in the front part, see bore part 11. The rear end of the chamber bore can also be sealed by means of a closure (see closure 12), in the same way as the front end.

Figure 4:
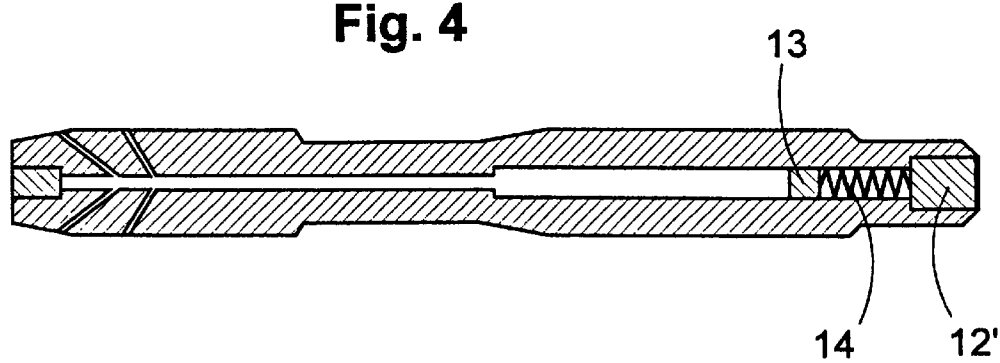

According to the embodiment in FIG. 4 the lubricant can be urged forwardly of the discharge passages by means of a plunger 13 and a spring 14. The spring 14 is moreover located between the axially movable plunger 13 and the end closure 12'.

Due to the integral lubricant chamber the screw tapping can also be performed in difficult materials without the use of expensive minimal lubrication devices and without additional lubrication from outside. In addition it is guaranteed that the lubricant comes out only when the tool rotates. Consequently only very small amounts are needed. Tests have shown that a lubricant volume of about 5 ml suffices for the whole life of a screw tap of the size M8 for the machining of heat treatable steel. The life of such a screw tap is about 90 minutes.

It should be clear that the outer geometry of the tool producing thread is immaterial to the inventive idea. Consequently the minimal lubricant chamber according to the invention can be used for any screw tap and any thread former.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An internal thread-producing tool, comprising a body having a rear shank portion and a front thread-forming portion, the body including a lubricant chamber disposed therein for storing liquid lubricant, the chamber including at least one lubricant discharge passage extending from the chamber to the thread-forming portion for discharging liquid lubricant, wherein the lubricant chamber has at least two different diameters over an axial length of the lubricant chamber.

2. The tool according to claim 1, wherein the chamber contains a minimal liquid lubricant.

3. An internal thread-producing tool, comprising a body having a rear shank portion and a front thread-forming portion, the body including a lubricant chamber disposed therein for storing liquid lubricant, the chamber including at least one lubricant discharge passage extending from the chamber to the thread-forming portion for discharging liquid lubricant, wherein the discharge passage has a diameter in the range of about 0.01 to 0.4 mm.

4. The tool according to claim 1, wherein the chamber extends along a center axis of the body.

5. The tool according to claim 4 wherein the chamber extends rearwardly from a front end of the body, a front end of the chamber being sealed by a closure.

6. An internal thread-producing tool, comprising a body having a rear shank portion and a front thread-forming portion, the body including a lubricant chamber disposed therein for storing liquid lubricant, the chamber including at least one lubricant discharge passage extending from the chamber to the thread-forming portion for discharging liquid lubricant, wherein the chamber also extends to a rear end of the body, a rear end of the chamber being sealed by a closure.

7. An internal thread-producing tool, comprising a body having a rear shank portion and a front thread-forming portion, the body including a lubricant chamber disposed therein for storing liquid lubricant, the chamber including at least one lubricant discharge passage extending from the chamber to the thread-forming portion for discharging liquid lubricant, further including a plunger disposed in the chamber and being forwardly spring-biased to urge liquid forwardly toward the discharge passage.

8. An internal thread-producing tool as set forth in claim 1, wherein the chamber includes at least two lubricant discharge passages extending from the chamber to the thread-forming portion for discharging liquid lubricant, the at least two discharge passages extending from the lubricant chamber at different angles relative to the chamber.

9. An internal thread-producing tool, comprising a body having a rear shank portion and a front thread-forming portion, the body including a lubricant chamber disposed therein for storing liquid lubricant, the chamber including at least one lubricant discharge passage extending from the chamber to the thread-forming portion for discharging liquid lubricant, wherein the chamber extends along a center axis of the body, the chamber extends rearwardly from a front end of the body, a front end of the chamber being sealed by a closure, and the chamber also extends to a rear end of the body, a rear end of the chamber being sealed by a closure.

* * * * *